(12) United States Patent
Laham et al.

(10) Patent No.: US 6,856,767 B2
(45) Date of Patent: Feb. 15, 2005

(54) OPTICAL SIGNAL QUALITY SELECTION SYSTEM

(75) Inventors: Mohammad Laham, Basking Ridge, NJ (US); Raj Acharya, Ocean, NJ (US); Roman Antosik, Colts Neck, NJ (US); Jayantha Das, Morganville, NJ (US); Bharat Dave, Howell, NJ (US); Chinnabbu Ekambaram, Freehold, NJ (US); Khem Gandhi, Marlboro, NJ (US); Frank Hujber, Mercerville, NJ (US); David Lowe, Howell, NJ (US); Frederick Renner, West Long Branch, NJ (US); Jiten Sarathy, Atlantic Highlands, NJ (US); Ronald Simprini, Red Bank, NJ (US); Boris Stefanov, Gillette, NJ (US); Tan Thai, Jackson, NJ (US); Ravi Vora, Freehold, NJ (US)

(73) Assignee: Alphion Corporation, Eatontown, NJ (US)

( * ) Notice: Subject to any disclaimer, the term of this patent is extended or adjusted under 35 U.S.C. 154(b) by 647 days.

(21) Appl. No.: 09/837,855

(22) Filed: Apr. 18, 2001

(65) Prior Publication Data

US 2002/0048060 A1 Apr. 25, 2002

Related U.S. Application Data

(60) Provisional application No. 60/238,365, filed on Oct. 6, 2000.

(51) Int. Cl.$^7$ ............................................ H04B 10/08
(52) U.S. Cl. ............................... 398/9; 398/25; 398/33
(58) Field of Search ........................... 398/9, 13, 14, 398/15, 16, 17, 18, 19, 20, 21, 26, 27, 28, 29, 33, 34, 177, 181

(56) References Cited

U.S. PATENT DOCUMENTS

| | | | | |
|---|---|---|---|---|
| 5,920,414 A | * | 7/1999 | Miyachi et al. | 398/14 |
| 5,933,258 A | * | 8/1999 | Flanagan et al. | 398/5 |
| 5,943,146 A | * | 8/1999 | Harano | 398/31 |
| 6,516,110 B2 | * | 2/2003 | Hayashi et al. | 385/17 |
| 6,587,236 B1 | * | 7/2003 | Butler et al. | 398/5 |

* cited by examiner

Primary Examiner—M. R. Sedighian
Assistant Examiner—Dalzid Singh
(74) Attorney, Agent, or Firm—Kaplan & Gilman, LLP

(57) ABSTRACT

The present invention provides an optical signal quality selection system for optimizing the quality of information transmission. The system splits an incoming optical signal into two equal signals. The split signals are evaluated in optical performance monitors, transmitting an electrical output message to a signal selector relating to the quality of the respective signal. A second electrical message is sent from the optical performance generator to an alarm indicator signal generator, which sends an optical signal to the signal selector to drop the one of the split signals and transmit the non-dropped split signal. An unequipped optical signal from an optical idle signal generator is triggered if no active optical signal is being transmitted.

6 Claims, 3 Drawing Sheets

OPTICAL SIGNAL QUALITY SELECTION SYSTEM

CROSS REFERENCE TO RELATED APPLICATIONS

This application claims priority of U.S. Provisional Patent Application Ser. No. 60/238,365, filed on Oct. 6, 2000.

FIELD OF THE INVENTION

The present invention relates to the field of communications, and more particularly to the field of communications by the transmission of digital data by optical signals.

BACKGROUND OF THE INVENTION

Current communications technology has adopted optical transmission of data as the medium of choice to obtain the benefits of high bandwidth transmission. As bandwidth increases for transmission through optical network elements, the reliability of the various elements becomes more critical. Although optical signals are known to be less prone to noise or interference, and thus more pure than electrically transmitted signals, the reliability and quality of the optical signal is also more critical because of the volume of data carried. The need for nearly one hundred percent availability drives network cost to a significant extent as it relates to the requirement for redundant equipment and its management to identify and restore a degraded signal within a network. It is generally accepted that a two-fold growth in bandwidth requires a two-fold increase in availability.

A highly available and reliable system involves component and interface redundancy, fault monitoring, and protection switching. Each of these functions is, in turn, available based on the following factors: component reliability, component redundancy ratio, protection switching speed, protection switching availability, failure detection speed, and detection mechanism availability.

An optical signal network system designed with adequate availability is more complicated than a similar electrical signal system because fault detection is necessarily at the optical signal level and localization of system faults involves a significant effort.

Therefore, it is an object of the present invention to provide an automatic optical signal quality selection system that does not require the optical signal to be converted into an electrical format for evaluation.

It is a further object of the present invention to provide an optical signal quality selection system able to discern between signals having different levels of degradation faster than an external system can detect the degraded signal.

It is another object of the present invention to provide an optical signal quality selection system able to delete an unacceptable quality signal and to transmit a signal after determining that its quality is acceptable.

It is another object of the present invention to provide an optical signal quality selection system able to inject an optical idle signal when no active signal is being transmitted through the system.

These and other objects will become more apparent from the description of the invention to follow.

SUMMARY OF THE INVENTION

The present invention provides an optical signal quality selection system for optimizing the quality of optical signal transmission. The system divides an incoming optical signal into two separated signals. The split signals are evaluated by a pair of optical performance monitors, the result of the evaluation is transmitted via an electrical output message to a selector relating to the quality of the respective signal. An optical signal from an optical idle signal generator, also known as an unequipped signal generator, is inserted when no active optical transmission exists in the system. When both signals (A) and (B) fail, an electrical message is sent from the optical performance monitor to an alarm indicator signal generator. If one of the signals (A) and (B) is determined to be better than the other, an optical signal is sent to the signal selector to drop the one of the split signals based on the comparative signal purity as determined by a set of selector state rules, and to transmit the non-dropped split signal.

DETAILED DESCRIPTION OF THE INVENTION

Figure 1:
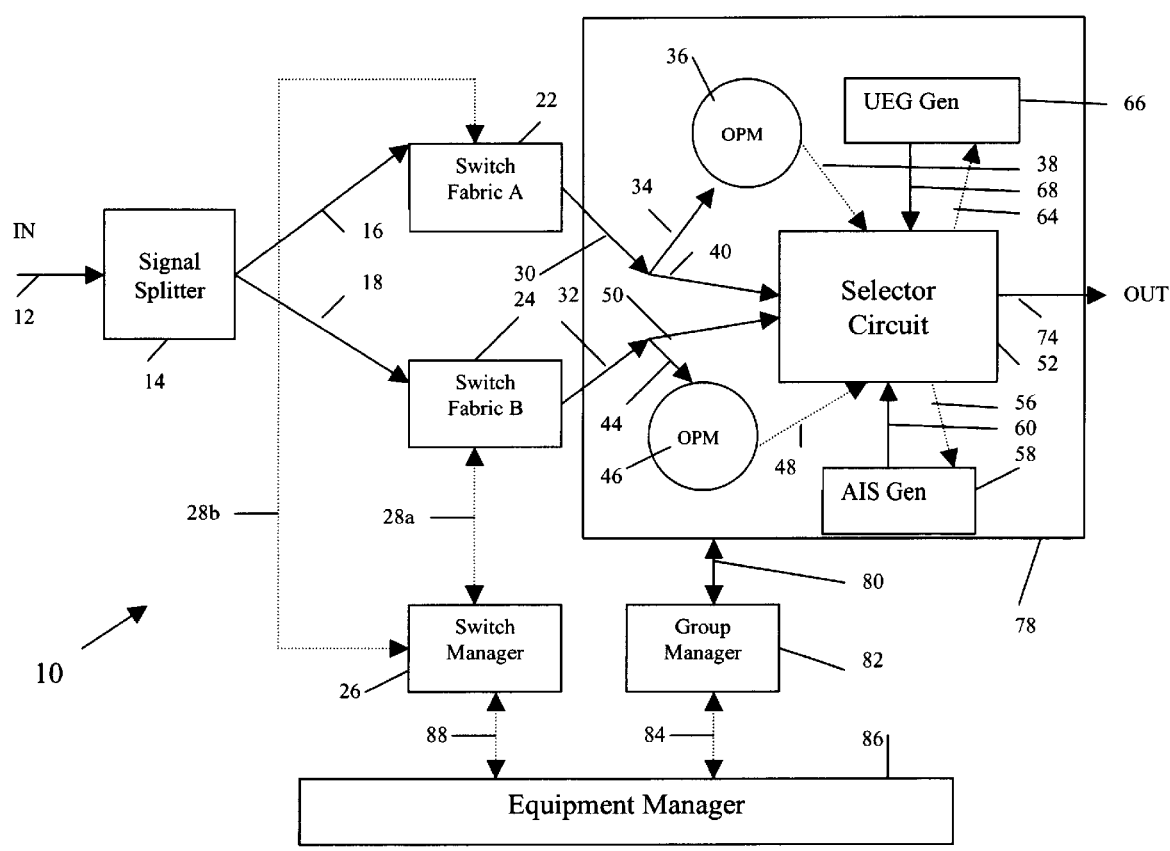
FIG. 1 is a schematic diagram of the optical signal quality selection system according to the invention.

In accordance with the disclosure contained in FIG. 1, the components and signal paths of the optical signal quality selection system 10 are illustrated diagrammatically. System 10 employs a combination of optical and electrical signals in a data selection system in a unique manner. For reasons of clarity, optical signals are depicted as solid lines and electrical signals are depicted as dotted lines. Input optical signal 12 is divided into split signal A 16 (indicating system side A) and split signal B 18 (indicating system side B) by signal splitter 14. Split signal A 16 is carried to switch fabric (SF) A 22 where it connects to a designated output path so as to exit as switch output A 30. Optical performance monitor (OPM) A 36 is connected in a manner to direct a sample probe signal A 34 thereto for evaluation of the optical signal quality according to a number of standard parameters, for example, power level, optical signal to noise ratio, wavelength, and Q factor (pertaining to the compactness of frequency distribution). OPM A 36 derives an evaluative result for switch output signal A 30, and OPM A 36 generates an electrical message A 38 in response to the evaluative result. Electrical message A 38 is transmitted from OPM A 36 to selector engine 52, which is described in detail below. Selector circuit 52 transmits an electrical signal 64 to unequipped signal generator (UEQ Gen) 66 if no active, data-bearing, optical signal is being transmitted, and UEQ Gen 66 responds with an optical carrier signal 68 to selector circuit 52. Thus the evaluation process involves receipt of an input first optical signal, transmission of a first electrical signal, transmission of a second electrical signal, and transmission of an output second optical signal.

Similarly, from signal splitter 14, split signal B 18 is carried to SF 24, from which switch output B 32 is transmitted to signal selector 52 as switch output B 50. OPM B 46 is connected in a manner to direct a sample probe signal B 44 thereto for evaluation of the signal quality according to the standard parameters noted above. OPM B 46 derives an evaluative result for switch output signal B 50, and OPM B 46 generates an electrical message B 48 in response to the evaluative result. Electrical message B 48 is transmitted from OPM B 46 to selector circuit 52, from which a responsive electrical message 56 is sent to optical alarm indicator signal generator (AIS Gen) 58, which sends an optical signal 60 to selector circuit 52. As noted above in the description of the signal evaluation and transmission in side A, the sequence is optical, electrical, electrical, optical.

A further layer of control circuit elements is shown in hierarchical representation in FIG. 1, wherein switch manager 26 serves to control the operation of SF A 22 and SF B 24 through electrical signals 28a and 28b, respectively. Group manager 82 controls the operation of the components in control circuit 78 through electrical signal 80. Equipment manager 86, in higher hierarchy level, controls switch manager 26 and group manager 82 through electrical links 88 and 84, respectively.

Figure 2:
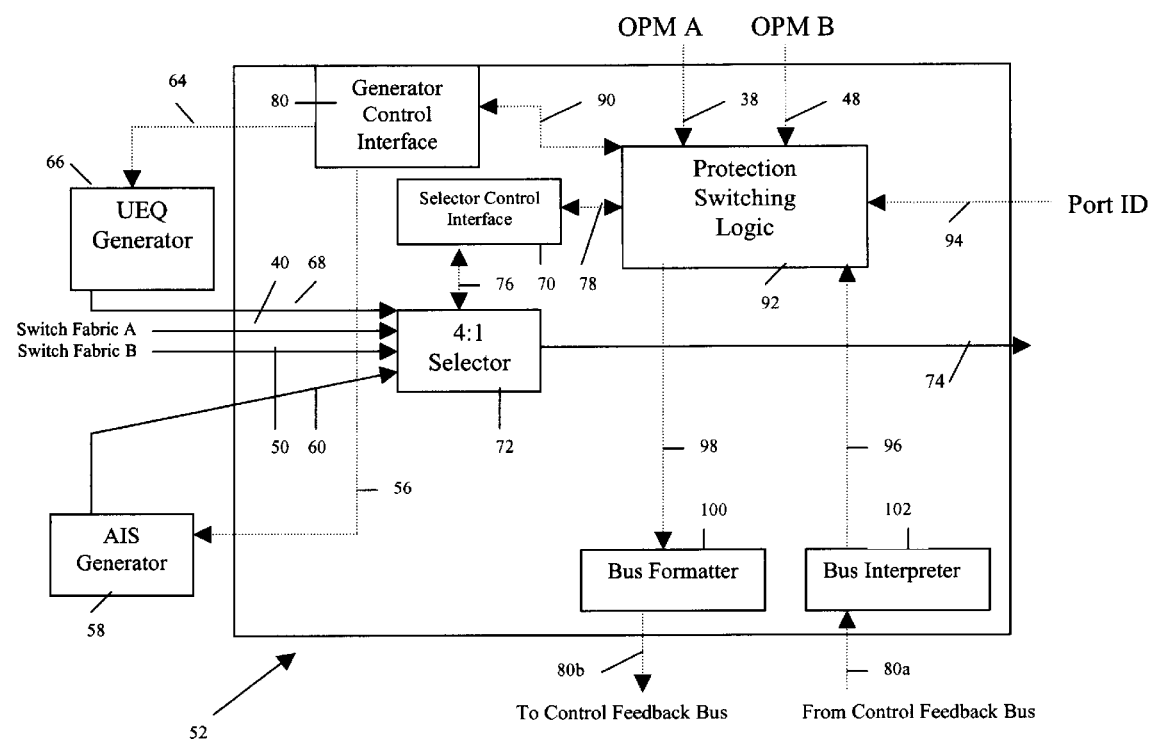
FIG. 2 is a schematic diagram of a selector circuit of the optical signal quality selection system of FIG. 1.

Referring now to FIG. 2, a detail of the components of control circuit 78 is illustrated with related optical and electrical connections therebetween. Optical switch output A 40 and B 50 connect from SF sides A and B respectively to 4:1 selector 72. Optical message 60 from AIS Generator 58 and optical carrier signal 68 from UEQ Generator 66 also feed into 4:1 selector 72. 4:1 selector 72 transmits a single output signal 74 selected from its four input signals based upon a series of input signals and messages from other components of selector engine 52 and selector state logic to be described below in reference to FIG. 3.

Referring further to FIG. 2, each of the additional components of selector circuit 52 are operative in response to and generate electrical signals. Protection switching logic 92 receives input as electrical message A 38 and electrical message B 48 respectively from OPM A and OPM B. Also, protection switching logic 92 receives input as port identification signal 94 and further as switch map signal 96 from bus interpreter 102, responding to control signal 80a from a control feedback bus with selector state status and OPM A and OPM B status. In addition, protection switch logic 92 transmits selector status signal 98 through bus formatter 100 to the control feedback bus via output 80b. Protection switching logic 92 interacts both with selector control interface 70 via bi-directional electrical signal 78 and with generator control interface 80 via bi-directional electrical signal 90. Further, selector control interface 70 interacts with 4:1 selector via bi-directional electrical signal 76, and generator control interface interacts with both UEQ generator 66 and with AIS generator 58. The logic state rules controlling the physical components will be described below in respect to FIG. 3.

Figure 3:
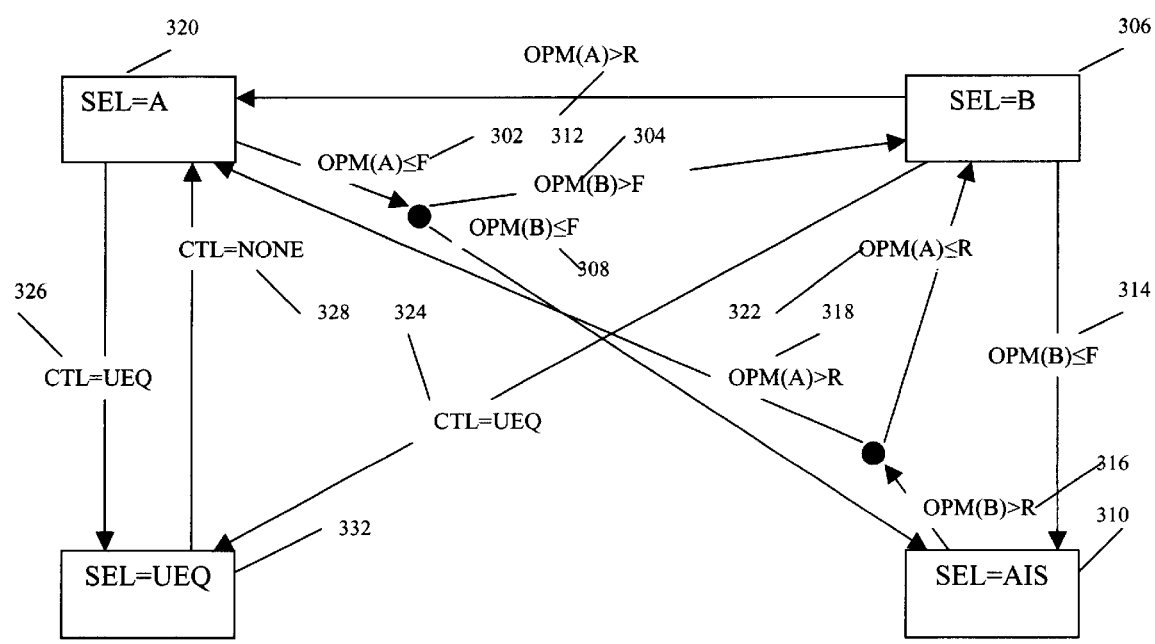
FIG. 3 is a selector state logic diagram as used in the present invention.

According to the logic circuit depicted in FIG. 3, a set of rules controlling the selections available to the optical signal quality selection system of the invention is laid out. As defined in this set of rules, "F" indicates a failed signal or no signal, and "R" indicates a degraded, but recoverable signal. Thus a result of "R" is superior to a result of "F". Starting at the upper left, coming out of box select A 320 is criterion OPM(A)≦F, indicating that the output of OPM(A) shows a failed or null A-side signal. In this condition, two choices are possible. If OPM(B)>F 304, signal B is greater than a fail level, the system selects B 306; If OPM(B) is >F 308, signal B fails, the system selects AIS 310, alarm indicator signal. From select AIS 310, if OPM(B)>R 316, indicating a good B side signal, the choices are if OPM(A)≦R 322 (degraded A side signal), wherein the system selects B 306 optical signal as the better signal for transmission, and if OPM(A) >R 318 indicating a good A side signal, the system selects A 320 optical signal as the better signal. Thus the logic circuit defaults to signal A when both A and B are good signals. Out of box select B 306, upper right, the system chooses whether OPM(A)>R 312 (good signal) and proceeds to select A 320; or if OPM(B)≦F 314 (failed B side signal) and proceeds to select AIS 310. From a select B 306 condition, a control=UEQ 324 will lead to select=UEQ 332. From select=UEQ 332, a control=None 328 message will select A 320. Also, select A 320 with a control=UEQ 326 message will result in selecting UEQ 332.

As described above, the optical signal quality selection system is useful to differentiate optical signal quality according to selected parameters and established logic rules to obtain an output optical signal with optimal data integrity.

While the present invention is described with respect to specific embodiments thereof, it is recognized that various modifications and variations thereof may be made without departing from the scope and spirit of the invention, which is more clearly understood by reference to the claims appended hereto.

What is claimed is:

1. A method for the selection of optical signal quality for the transmission of data, comprising the steps of:
    (a) receiving an incoming optical signal;
    (b) splitting the incoming optical signal into a first split signal and a second split signal;
    (c) evaluating the quality of the first split signal in a first optical performance monitor;
    (d) generating and transmitting from the first optical performance monitor to a signal selector engine a first electrical message indicative of the quality of the first split signal;
    (e) evaluating the quality of the second split signal in a second optical performance monitor;
    (f) generating and transmitting from the second optical performance monitor to the signal selector engine a second electrical message indicative of the quality of the second split signal;
    (g) dropping from transmission one of the first or the second split signal that was evaluated to be of lesser quality than the other of the split signals;
    (h) generating and transmitting from the signal selector to an alarm indicator signal generator an electrical message indicative that both signals are unacceptable;
    (i) generating and transmitting from the alarm indicator signal generator to the signal selector an optical message if both signals are of unacceptable quality; and
    (j) continuing with the transmission of the other of the first or the second split signals that was indicated to be of higher quality than the other of the split signals.

2. The method for the selection of optical signal quality for the transmission of data as claimed in claim 1, further comprising the steps of providing to the signal selector an indicator of a lack of an active input optical signal if no active signal exists.

3. The method for the selection of optical signal quality for the transmission of data as claimed in claim 1, further comprising the steps of connecting the first split signal through a first switch fabric and the second split signal through a second switch fabric.

4. A method for the selection of optical signal quality for the transmission of data, comprising the steps of
    (a) evaluating the quality of a first optical signal and a second optical signal respectively in a first and a second optical performance monitor;
    (b) generating and transmitting from each optical performance monitor to a signal selector circuit a first and a second electrical message indicative of the quality of the first optical signal and the second optical signal respectively;

(c) generating and transmitting from the signal selector circuit to an alarm indicator signal generator an electrical message indicative of the quality of the first optical signal and the second optical signal;

(d) generating and transmitting from the alarm indicator signal generator to the signal selector circuit an optical message indicative of a failure if both the first and the second optical signals are evaluated to be unacceptable;

(e) transmitting a selected one of the first optical signal or the second optical signal if at least one of the first and second optical signals is acceptable.

5. The method for the selection of optical signal quality for the transmission of data as claimed in claim 4, further comprising the steps of providing to the signal selector an indicator of a lack of an active input optical signal if no active signal exists.

6. The method for the selection of optical signal quality for the transmission of data as claimed in claim 5, further comprising the step of connecting the first optical signal and the second optical signal through respective switch fabrics.

* * * * *